3,408,712
CRYOGENIC EMBALMING PROCESS
Richard S. Pauliukonis and George Matlow, Cleveland, Ohio, assignors to Cryobank, Inc., Cleveland, Ohio, a corporation of Delaware
No Drawing. Filed Apr. 15, 1966, Ser. No. 542,755
8 Claims. (Cl. 27—22)

This invention relates to a method of embalming. More particularly the invention relates to a method of cryoembalming, by which is meant the preservation of human bodies for extended periods at very low temperatures.

No rapidly destructive processes are presently known to occur in simple or complex organisms between about −150° F. and absolute zero. (However gradual accumulation of changes on an atomic scale due to naturally occurring ionizing radiation remains a theoretical possibility as an extremely slow destructive process, although the materials of construction and/or insulation in low temperature storage vaults will offer a significant protection factor.) Theoretically, any organism that can survive cooling below about −150° F. and be rewarmed to normal biological temperatures can be maintained indefinitely, if not perpetually, even in the viable state by storage at temperatures below about −240° F. See P. Mazur, Basic Problems in Cryobiology, Nine Advances in Cryogenic Engineering 36 (1964); also A. U. Smith, Biological Effects of Freezing and Supercooling, Williams and Wilkins Co., Baltimore, Md.

However, the invention is not directed to the preservation of whole body viability. This is not presently attainable for human beings or other extremely complex organisms that are subjected to very low temperatures. Indeed, the objective of freeze preservation of complex multicellular higher animals, in the sense of maintaining viability, has been characterized as unreasonable. See International Science and Technology 71 (June 1964 issue).

The present invention does provide a method for storing and preserving human bodies or other complex organisms for time intervals of indefinite duration without any significant change in shape or appearance in the steady-state frozen condition, and with little or no significant change in exterior shape or appearance and with minimal internal physical and biological change during the achievement of the steady-state frozen condition. In this steady-state condition the preserved human body will remain almost absolutely stable for an indefinite interval of months, years, or millenniums.

The preservation that is accomplished may be favorably compared with that of conventional embalming which depends on chemical preservatives to inhibit enzyme action and thus prevent either autolysis or microbiological growth. In conventional embalming, complete penetration of the remains is necessary and this is rarely achieved. In conventional embalming, often ten percent or twenty percent of body volume is not adequately penetrated and is subject to decomposition. Over extended periods of time desiccation may occur even in those parts of the body where there is good penetration. The limited degree of penetration that is accomplished involves the flushing of body fluids and particularly blood which is replaced with preservative fluids, a practice that is desirably eliminated if possible. In the practice of the present invention, all these drawbacks may be eliminated.

The invention contemplates a cryoembalming method wherein the remains of a deceased person are reduced in temperature in a sequence of two temperature-reducing steps. The first step carries the remains through a phase change to a solidly frozen conditions. This change is accomplished at a reasonably uniform cooling rate that is maintained within limits that are consistent with rates that are optimal from the cellular or microstructural standpoint. In cooling through the phase change, too great a rate of temperature reduction results in gross structural damage to the remains, possibly due to stresses set up by steep internal temperature gradients. Too slow a rate of temperature reduction results in decay and putrefaction. However different criteria appear to apply during reduction of temperature through still lower temperature ranges, and this is economically and effectively accomplished in a second separate step, and at different cooling rates.

The general object of the present invention is to provide an improved method of embalming. More specifically, an object of the invention is to provide for the cold preservation of the remains of a person who is clinically dead in such a way as to minimize mechanical injury and destructive biological or bacteriological action prior to the attainment of a steady-state frozen condition.

Somatic death, or death of the whole body, occurs upon cessation of cardiac activity, circulation, and respiration. Some tissues may remain alive for limited periods of time, but metabolic activity slows and stops as the temperature of the body falls.

Blood begins to clot soon after circulation ceases. Blood exposed to air coagulates in approximately twenty minutes, but blood within the body remains in a fluid state for extended periods. Gross coagulation of blood starts in about four to five hours. Fluid blood may settle out in layers with a lower deep red portion and an upper yellowish portion.

Under average conditions, the body will cool at a rate of from 3° F. to 3.5° F. per hour for the first few hours, with a slow decrease in the cooling rate as environmental temperature is approached.

After death there commences a breakdown of tissue by enzymes liberated by that tissue. This process of autolysis, or self-digestion, varies widely in rate among various tissues. Autolysis is rapid in the pancreas and the lining of the gall bladder and digestive tracts. The process of self-destruction also starts relatively early in the liver and kidneys, say about thirty minutes following death.

Following death, bacteriological activity in the gastrointestinal tract continues, and as metabolic activity ceases, organisms from this site invade the remainder of the body and cause widespread putrefaction. The invading bacteria produce offensive odors and make the tissues crackly. Blood pigments which have been changed by action of the bacteria may discolor the organs and give them a greenish hue.

In the practice of the invention the remains of a newly deceased person are lowered from their relatively high temperature at or above room temperature, or such body temperature of the corpse as is pre-established by ambient conditions, to an extremely low temperature by a sequence of first and second temperature-reducing steps succeeded by a storing step.

In the first temperature-reducing step, the temperature of the remains are reduced at a relatively rapid rate of from about .5° F. to 50° F. per minute to a temperature level between minus 20° F. and minus 50° F. This step is accomplished by washing the remains in a dynamic or flowing body of cold fluid such as liquid nitrogen in its vapor state, and also to some degree in its liquid state in some preferred procedures. In the preferred procedures, the coolant such as liquid nitrogen is introduced into the colon of the newly deceased so that the interior of the colon, or a portion thereof, is washed with the coolant fluid which is then expressed from the rectum by additional incoming coolant. Initially the coolant may be introduced in liquid form only to vaporize immediately within the colon, but as the colon becomes cooled, the coolant may remain in its liquid state until it is rectally discharged.

Whether or not internal cooling is employed as just described, the invention contemplates that at least the exterior of the remains will be washed in a dynamic or flowing body of coolant such as the vapor of liquid nitrogen. During this cooling step, the coolant is continuously supplied and flowed past the remains which are immersed in the flowing body of coolant for accelerated heat exchange. The flowing body of coolant may be regarded as a flowing stream that immerses the remains. Where coolant is introduced into the colon and is discharged from the rectum, this rectal discharge may serve as the source of the coolant stream.

In the second cooling step, the remains are placed in a relatively static environment maintained at a temperature of below about minus 300° F. In such a static environment the remains will gradually fall in temperature to a level below about minus 240° F. This second cooling process may continue over a period of several days or a week or more.

Experimental animals, embalmed according to these procedures, and then thawed, reveal the following: General appearance was normal. There was no skin discoloration and no unusual odor. In the thorax, the heart and great vessels were normal in appearance. There were no breaks in the aorta or in the superior and inferior venae cavae. The lungs were normal in appearance, the diaphragm was intact. In the abdomen, there were no discontinuities or abrasions of the colon. The bladder, stomach, and small and large intestines were intact and normal in appearance as were the spleen, liver, gall bladder, and kidneys.

Tissues taken from animals that had been experimentally embalmed according to the foregoing procedures were examined microscopically. Heart sections generally showed the usual architecture. Irregular disruption of fibers was represented by small to larger spaces of irregular to smooth outline. In some instances vacuoles appeared in the myocardium. High powered examination showed the nuclear structure to be fairly uniform and somewhat deeply stained. The fibers showed a pattern of homogenous to finely fibrillar with some widespread myocardial units showing cross-striations as observed under subdued light. There were not other notable findings.

Lung sections generally showed the usual architecture. Foci of collapse of alveoli were present and there was some pooling of blood in the larger vessels. Occasionally the red cells were somewhat elongated in crystalline forms of hemoglobin but intact erythrocytes were also in evidence. The epithelium lining of the bronchi was relatively intact. There was some granular pink staining material in the alveoli but there was no further pronounced change.

Liver sections showed the usual architecture. However, the cells showed some change as evidenced by somewhat dark staining nuclei and irregular vacuolation with the cytoplasm having a granular to string-like pattern but pale to water clear areas greatly predominating.

Spleen sections showed the usual architecture. The trabecular pattern was conspicuous. Individual cell patterns were observed throughout but the definition between cells was indistinct in the sinusoids because of larger amounts of granular pale pinkish blue staining material.

The kidney sections showed the usual pattern. The glomeruli were generally somewhat large but did not have an increase in cellularity. The tubules show swelling of the cell and occasionally some obscuring of the nuclei. The nuclei were fairly homogenous and deeply chromatic. Granular pink staining material and occasional hyaline casts appeared in the lumens of the tubules.

Colon sections showed the usual pattern. There was good definition of cells lining the glands. The surface epithelium was often absent. Other layers of the colon wall beyond the mucosa were not remarkable.

In general, such changes as were observed in the structures were entirely ascribable to the effects of freezing and then thawing. The separation among myocardial fibers and within myocardial cells represents the effects of ice crystal formation. The hepatic cells showed alternation of the protein moiety of the cytoplasm by aggregates representing the protein and clear spaces the presence of liquid. This effect was shown in the spleen by lack of definition of cells. Of considerable interest was the finding that in the lung there were larger vessels in which the red cell mass showed some intact corpuscles but also an extensive formation of small to large crystals of hemoglobin. The preservation of structure in the colon was surprisingly good.

These tests demonstrated that the prescribed cooling procedure accomplished a whole-body transition from liquid to solid and then to low temperature levels without drastic structural deformation by ice crystal formation, and with practically no alteration of the cell membranes. Salt formation and crystallization was sufficiently well controlled to closely preserve the micro-structure of the individual organs. There were no indications definitely contrary to the maintenance of viability potentials of individual organs, although the injury found in the cellular structure of the organ tissues was considered to indicate irreversible destruction of the over-all metabolic machinery of the whole organism.

In practical applications of the embalming process, upon the determination of clinical death by a licensed physician and as soon as the remains are considered eligible for preservation, the following alternatives are contemplated:

(1) The remains are delivered to a morgue or to stationary equipment where the first cooling step described above is performed. Before the cooling step is initiated, the body is dressed as lightly as possible, the mouth and eyes are closed, and the arms and legs are placed into appropriate position.

(2) The body is delivered to a vehicle carrying cooling equipment adapted to perform the first cooling step described above. Preparation is the same as described in the preceding paragraph.

After the body has been cooled in the first cooling step, it may be held in a cool environment at a temperature below about 0° F., or even briefly removed from a cool environment for viewing, before initiation of the second cooling step. Desirably the second cooling step is initiated soon after completion of the first cooling step.

In the second cooling step, the body is placed in a relatively static environment maintained at a temperature of below about −300° F. and is allowed to gradually cool within said environment until the temperature of the remains is at a level less than about −240° F. The remains are then stored by holding them at a temperature of less than about −240° F. This can be done by simply leaving the remains in the relatively static environment in which they have been cooled in the second cooling step.

The invention is not restricted to the slavish imitation of each and every one of the details described above which have been set forth merely by way of example with the intent of most clearly setting forth the teachings of the invention. Obviously devices may be provided which change, eliminate or add certain specific structural details without departing from the invention.

What is claimed is:

1. A method of embalming, without flushing of body fluids, by lowering the temperature of the remains of a newly deceased person from a temperature at or above room temperature to an extremely low temperature at which the remains are held, said method comprising first and second temperature-reducing steps and a storing step, said first temperature-reducing step comprising reducing the temperature of the remains at a relatively rapid rate of from about .5° F. to 50° F. per minute to a temperature below about —20° F. and said second cooling step comprising further reducing the temperature of the remains at a reduced rate to a temperature below about —240° F. and said storing step comprising maintaining said remains at below about —240° F.

2. A method as in claim 1 in which said first temperature-reducing step comprises washing the remains in a dynamic or flowing body of coolant such as the vapor of liquid nitrogen, and said second temperature-reducing step comprises placing the remains in a relatively static environment maintained at a temperature of below about —300° F.

3. A method as in claim 1 in which said first temperature-reducing step comprises washing the remains in a dynamic or flowing body of coolant with at least some of the washing occurring internally by introducing coolant internally and allowing it to wash out of a body opening.

4. A method as in claim 3 in which the cooling is introduced within the colon and is allowed to wash out of the rectum.

5. A method as in claim 1 in which said first temperature-reducing step comprises washing the remains in a dynamic or flowing bath of cold gas such as the vapor of liquid nitrogen, said second temperature-reducing step comprises placing the remains in a relatively static environment maintained at a temperature of below about —300° F. and allowing said environment to gradually reduce the temperature of the remains to below about —240° F., and said storing step comprises leaving the remains in said relatively static environment after the temperature of the remains has been lowered below about —240° F.

6. A method as in claim 1 in which said first temperature-reducing step comprises washing the remains in a dynamic or flowing bath of cold gas such as the vapor of liquid nitrogen, said second temperature-reducing step comprises placing the remains in a relatively static environment maintained at a temperature of below about —300° F. and allowing said environment to gradually reduce the temperature of the remains to below about —240° F., and said storing step comprises holding the remains in a static environment of a temperature less than about —240° F.

7. A method as in claim 1, including the step of holding the remains at a temperature below about 0° F. for a time interval between said first and second temperature-reducing steps.

8. A method of embalming by lowering the temperature of the remains of a newly deceased person from the body temperature pre-established by ambient conditions to an extremely low temperature at which the remains are held, said method comprising first and second temperature-reducing steps and a storing step, said first temperature-reducing step comprising reducing the temperature of the remains at a relatively rapid rate of from about .5° F. to 50° F. per minute to a temperature below about —20° F. and said second cooling step comprising further reducing the temperature of the remains at a reduced rate to a temperature below about —240° F. and said storing step comprising maintaining said remains at below about —240° F.

References Cited

UNITED STATES PATENTS

| | | | |
|---|---|---|---|
| 266,294 | 10/1882 | Johnson et al. | 27—22 |
| 2,415,455 | 2/1947 | Barnes et al. | 128—399 |
| 3,034,843 | 3/1962 | Moon | 27—28 XR |
| 3,079,762 | 5/1963 | Morrison. | |
| 3,295,220 | 1/1967 | Savarj et al. | |
| 3,297,454 | 1/1967 | Webster et al. | |

FOREIGN PATENTS 188,447  11/1935  Switzerland.

RICHARD A. GAUDET, *Primary Examiner.*

WILLIAM E. KAMM, *Assistant Examiner.*